United States Patent [19]

Yagi et al.

[11] Patent Number: 4,589,604
[45] Date of Patent: May 20, 1986

[54] CAMERA DEVICE

[75] Inventors: Michio Yagi; Eiji Ito, both of Hachioji, Japan

[73] Assignee: Konishiroku Photo Industry Co., Ltd., Tokyo, Japan

[21] Appl. No.: 554,379

[22] Filed: Nov. 25, 1983

Related U.S. Application Data

[63] Continuation of Ser. No. 327,270, Dec. 4, 1981, abandoned.

[30] Foreign Application Priority Data

| Dec. 9, 1980 | [JP] | Japan | 55-172652 |
| Dec. 9, 1980 | [JP] | Japan | 55-172653 |
| Dec. 24, 1980 | [JP] | Japan | 55-182097 |
| Dec. 24, 1980 | [JP] | Japan | 55-182098 |
| Dec. 24, 1980 | [JP] | Japan | 55-182099 |
| Dec. 29, 1980 | [JP] | Japan | 55-185698 |
| Dec. 29, 1980 | [JP] | Japan | 55-185699 |
| Jan. 16, 1981 | [JP] | Japan | 56-3826 |
| Mar. 24, 1981 | [JP] | Japan | 56-41722 |

[51] Int. Cl.⁴ ............ G03B 1/04; G03B 1/24
[52] U.S. Cl. ................................ 242/71.6
[58] Field of Search ................. 242/71–71.6, 242/67.2, 67.4, 202, 205–207, 209–210; 354/212–214

[56] References Cited

U.S. PATENT DOCUMENTS

| 2,861,752 | 11/1958 | Palmer | 242/202 X |
| 3,135,182 | 6/1964 | Hintze et al. | 242/71 X |
| 3,385,189 | 5/1968 | Hennig et al. | 242/71 X |
| 3,448,669 | 6/1969 | Suzuki | 242/71.6 X |
| 3,598,033 | 8/1971 | Sasaki | 242/71.6 X |
| 3,779,484 | 12/1973 | Porazinski | 242/206 |
| 3,882,516 | 5/1975 | Ogiso et al. | 242/71 X |
| 4,146,189 | 3/1979 | Sunouchi et al. | 242/71.4 |
| 4,227,678 | 10/1980 | Laky | 242/67.2 X |

Primary Examiner—John M. Jillions
Attorney, Agent, or Firm—James E. Nilles

[57] ABSTRACT

A camera device wherein a one-way clutch or a friction clutch is provided between a driving power source and a winding spool, a one-way clutch or a friction clutch is provided between a rewinding shaft and a rewinding spool, said driving power source and a sprocket, or a one-way clutch or a friction clutch is provided between a shaft of said sprocket and the same sprocket. The speed of revolution in a rewinding direction of said driving power source during a rewinding operation is set to a level not lower than a speed of revolution of said winding spool rotated in the rewinding direction by a film being rewound. The winding power source and the rewinding shaft both of which are adapted to be rotated positively at different speed ratios.

10 Claims, 8 Drawing Figures

CAMERA DEVICE

This application is a continuation of application Ser. No. 327,270, filed Dec. 4, 1981, abandoned.

BACKGROUND OF THE INVENTION

1. Field of the Invention

This invention relates to an improvement in a camera device, and more particularly to a film winding device capable of carrying out film winding and rewinding operations stably, lightly and soothly, minimizing the power consumption of an automated device of this kind using a motor, miniaturizing such an automated film winding device with ease, employing without trouble an auto-loading system and an automatic rewinding system, in which no preparatory operations for the rewinding of a film are required, and leaving an end of a cartridge-contained film not wound into the cartridge during the rewinding thereof.

2. Description of the Prior Art

There are the following two types of known film winding devices for cameras, which employ a winding spool and a sprocket.

The first type of film winding device employs a sprocket-driving system, in which a film to be wound is fed by a sprocket by a predetermined amount (corresponding to one frame) each time to be taken up around a winding spool as the sprocket and spool are rotated simultaneously. The second type of film winding device employs a sprocket-driven system, in which a film to be wound is fed by a winding spool alone with a sprocket used solely for controlling a take-up amount of the film. In the first type of film winding device, a friction clutch is provided between a winding shaft and the winding spool so as to compensate the difference between the film feed speed of the sprocket and the film take-up speed of the winding spool, which occurs when the diameter of the winding of film on the winding spool is varied. When such a friction clutch is used, not only the winding resistance is increased but also a film winding operation becomes unstable. Especially, when a motor is used to wind a film, an increase in the winding resistance results in an increase in the power consumption thereof, and it naturally becomes necessary that the power and size of the motor be increased. This hinders the miniaturization of a camera. In addition, an unstable film winding operation referred to above has an adverse effect on a camera device employing a film autoloading system. On the other hand, in the second type of film winding device, a friction clutch is not used but a film is wound as it is drawn by the wind spool. Accordingly, a film winding angle is varied in accordance with a change in the diameter of the winding of film on the winding spool. As the diameter of the winding of film is increased, a winding resistance is also increased. Moreover, since a film to be loaded is not fed by the rotation of the sprocket, it is difficult to employ an auto-loading system. This constitutes a great disadvantage of this type film winding device.

The above two types of film winding devices will be discussed with respect to the film rewinding operations thereof. In the first film winding device employing a sprocket-driving system, it is necessary that a preparatory operation for setting the sprocket in a freely rotatable state by carried out before rewinding the film. In the second film winding device employing a sprocket-driven system having, for example, a winding lever, it is necessary that a preparatory operation for cutting the connection between the winding shaft and winding spool by a certain means be carried out before rewinding the film. The latter preparatory operation also requires to be carried out in the first film winding device. In order to carry out the rewinding of a film without conducting such a preparatory operation, it is necessary that a friction clutch be provided between the winding shaft and winding spool to slide the latter. However, when a friction clutch is provided to slide the winding spool, a rewinding load is increased greatly, so that the power consumption of the film rewinding device, which is driven by a motor, is much increased. This makes it necessary to increase the power and size of the motor, and hinders the miniaturization of a camera.

In any of the above two types of film winding devices, in which a cartridge-contained film is used, a winding load is increased to a great extent as an amount of the film, which is being wound, and which remains in the cartridge, is decreased. It is considered that the causes of this problem reside in the following. The spool is held in the cartridge in a simple form having a comparatively high bearing resistance. As the diameter of the winding of film on the spool is decreased, a tensile force of the film for rotating the spool is increased, and an angle of bend of that portion of the film which is at an outlet of the cartridge becomes acute, so that a film-drawing resistance is increased. When an amount of the film remaining in the cartridge is large, the diameter of the winding of film is large. In such a case, a large rotary torque is applied to the spool, and the film is drawn out without being bent greatly at the outlet of the cartridge, even if a tensile force of the film is low. Thus, the film is wound with a low resistance. When an amount of the film remaining on the spool has become small, i.e. after around 30 frames of a cartridge-contained 36-frame roll film have been paid out, a high tensile force of the film is required for rotating the spool, and, moreover, an angle of bend of that portion of the film which is at the outlet of the cartridge becomes acute. Accordingly, the spool is pressed at the flange thereof strongly against a light-shielding member provided in the vicinity of the outlet of the cartridge. Thus, a winding load is increased as mentioned above, and the power consumption of the film winding device, which is driven by a motor, is increased greatly. This makes it necessary to increase the power and size of the motor, and hinders the miniaturization of a camera device.

SUMMARY OF THE INVENTION

An object of the present invention is to provide a camera device, which is free from the drawbacks and problems encountered and involved in the above-described conventional film winding devices.

The above and other objects of the invention will become apparent from the following description of the preferred embodiments taken in conjunction with the accompanying drawings.

DESCRIPTION OF THE PREFERRED EMBODIMENTS

Figure 1:
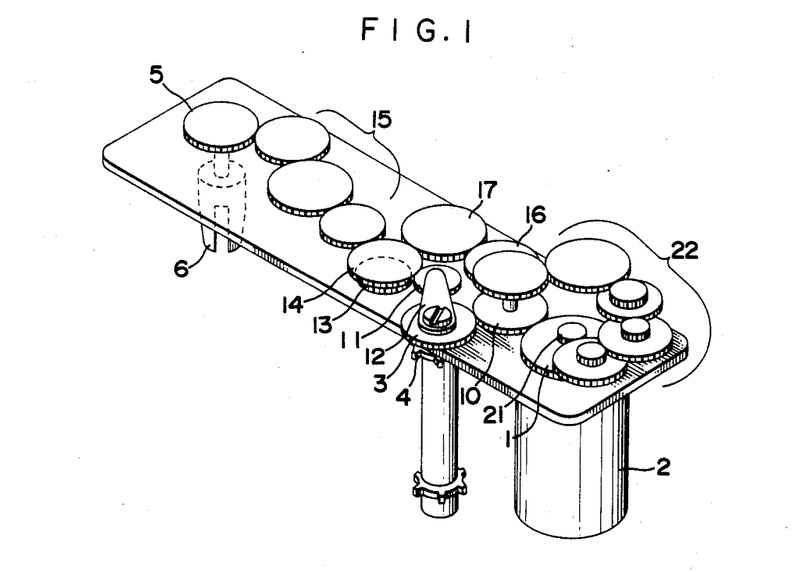
FIG. 1 is a perspective view of a winding device for cameras according to the present invention.
Figure 2:
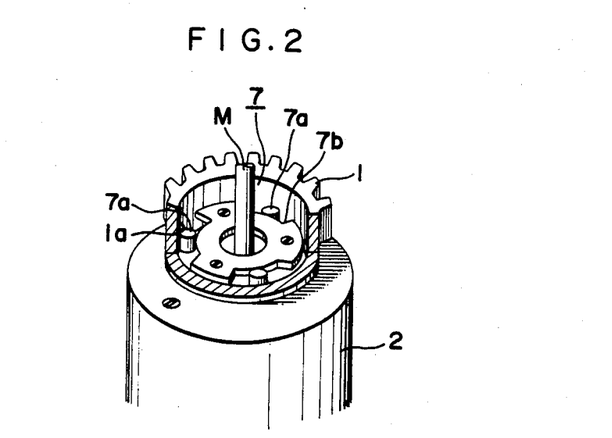
FIG. 2 is a perspective view of a winding spool portion of the winding device shown in FIG. 1.
Figure 3:
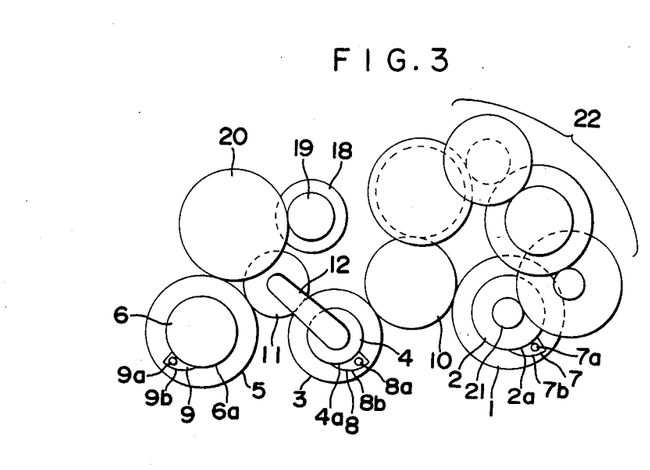
FIG. 3 is a plan view of another embodiment of a winding device according to the present invention.

Referring to the drawings, reference numeral 1 denotes a gear mounted on a winding shaft, 2 a winding spool, 3 a gear mounted on a shaft of a sprocket, 4 a sprocket, 5 a gear mounted on a rewinding shaft, and 6 a rewinding coupling joined to a rewinding spool or a spool of a cartridge, which rewinding coupling will be hereinafter called simply "a rewinding spool". In the embodiments shown in the drawings, a one-way clutch is provided between the above-mentioned gear and spool or sprocket. Reference numeral 7 denotes a one-way clutch provided between the gear 1 and winding spool 2. An example of the one-way clutch 7 shown in FIG. 2 consists of the inner surface 1a of the gear 1, clutch discs 7a, and inclined clutch surfaces 7b of a clutch plate set on the upper end surface of the winding spool 2. Another example of the one-way clutch 7 shown in FIG. 3 consists of the outer circumferential surface 2a of the winding spool 2, a clutch disc 7a, and a groove type inclined clutch surface 7b provided at the inner side of the gear 1. Reference numeral 8 denotes a one-way clutch provided between the gear 3 and sprocket 4, and 9 a one-way clutch provided between the gear 5 and rewinding spool 6. In the embodiment shown in FIG. 1, one-way clutches provided with inclined clutch surfaces on the side of the sprocket 4 and rewinding spool 6, respectively, as shown in FIG. 2 are used. In the embodiment shown in FIG. 3, one-way clutches 8, 9 provided with inclined clutch surfaces 8b, 9b on the side of the gears 3, 5, respectively, are used. Reference numerals 4a, 6a denote the outer circumferential surfaces of the sprocket 4 and rewinding spool 6, respectively, which take part in the formation of the one-way clutches 8, 9, respectively. These one-way clutches are used in such a type as shown in FIG. 2 or 3, and may be used otherwise; they may have a ratchet type. When the gear 1 in each of the one-way clutches shown in the drawings, is rotated counter-clockwise relatively to the winding spool 2, the clutch discs 7a are engaged tightly with the gear 1 and winding spool 2 to connect them together operatively. When the gear 1 is not rotated in the abovementioned manner, the clutch discs 7a are in a non-engaged state with respect to the gear 1 and winding spool 2 to keep them in an independently rotatable state. The one-way clutch 8 works in the same manner as the one-way clutch 7 with respect to the relation between the gear 3 and sprocket 4. The one-way clutch 9 is different from the other one-way clutches in that, when it is rotated clockwise, the gear 5 and rewinding spool 6 are connected together operatively.

Reference numeral 10 denotes a connecting gear engaged with the gears 1, 3 to rotate them in the same direction, and 11 a change-over gear which is engaged with the gear 3 to set a speed ratio of the gear 3 to gear 5 to a different level when a winding operation is shifted to a rewinding operation, and vice versa, and which is supported via a shaft on a change-over arm 12 oscillatable about a shaft of the sprocket 4. When the film winding device of a type shown in FIG. 1 is in a winding operation, the change-over gear 11 is engaged with an over-drive gear 13 to increase the speed of rotation of the gear 3 and transmit the rotation therefrom to the gear 5 via a large gear 14, which is rotated with the over-drive gear 13, and a transmission gear train 15. When the same film winding device is in a rewinding operation, the change-over gear 11 is engaged with a synchronous gear 16, which is capable of transmitting a peripheral speed as it is, to transmit the rotation of the gear 3 at the same peripheral speed from the synchronous gear 16 to the gear 5 via a carrier gear 17, large gear 14 and transmission gear train 15. When the film winding device of a type shown in FIG. 3 is in a winding operation, the change-over gear 11 is engaged directly with the gear 5 to transmit the rotation of the gear 3 thereto at the same peripheral speed. When the same film winding device is in a rewinding operation, the change-over gear 11 is engaged with a reduction gear 18 to reduce the speed of rotation of the gear 3 and transmit the rotation therefrom to the gear 5 via a small gear 19, which is rotated with the reduction gear 18, and a carrier gear 20.

A driving power source used to wind and rewind a film is a motor, which will be described later, and which is provided inside the winding spool 2. What is designated by a letter, "M" in FIG. 2 is an output shaft of the motor. The winding and rewinding forces are transmitted from a gear 21 mounted on the shaft M to the connecting gear 10, which is engaged with the gears 1, 3, via a train of reduction gears 22.

The gear 1 on the winding shaft, gear 3 on the shaft of sprocket, and gear 5 on the rewinding shaft are connected together by means of such a rotation transmission mechanism as mentioned above. These three gears are rotated in the same direction in any case. Namely all of them are rotated counter-clockwise during a winding operation, and clockwise during a rewinding operation. The rotation transmission mechanism referred to above is constructed in such a manner that the gears 1, 3, 5 have a speed ratio as will be described below. During a winding operation, the sprocket shaft, i.e. the gear 3 mounted thereon is rotated at a speed of revolution not higher than that of the sprocket 4 rotated by a film wound around the winding spool 2 which is rotated by the winding shaft, i.e. the gear 1 mounted thereon, and the rewinding shaft, i.e. the gear 5 mounted thereon, at a speed of revolution not lower than that of the rewinding spool rotated by the film. During a rewinding operation, the gear 3 is rotated at a speed of revolution not lower than that of the sprocket 4 rotated by the film rewound around the rewinding spool 6 which is rotated by the gear 5, and the gear 1 at a speed of revolution not lower than that of the winding spool 2 which is rotated by the film.

Let $\omega 1$ equal the speed of revolution of the gear 1; $\omega 3$ the speed of revolution of the gear 3; $\omega 5$ the speed of revolution of the gear 5; $D2$ the diameter of the winding of film on the winding spool 2; $D4$ the diameter of the sprocket 4; and $D6$ the diameter of the winding of film on the rewinding spool 6. The relation between these elements during a winding operation is determined by the formulae, $\omega 1 \cdot D2/D4 \geq \omega 3$ and $\omega 1 \cdot D2/D6 \leq \omega 5$, i.e. $\omega 1/\omega 3 \geq D4/D2$ and $\omega 1/\omega 5 \leq D6/D2$ or $\omega_3/\omega_5 \leq D_6/D_4$. In order to maintain this relation constantly during a winding operation, it is necessary to set a speed ratio $\omega_1/\omega_3$ of the gear 1 to gear 3 to a level equal to or higher than a ratio of the diameter of the sprocket 4 to that of the winding spool 2 in a bare state since the diameter $D_2$ of the winding of film on the winding spool 2, which is increased as a film winding operation progresses, is minimal in an initial stage of a film winding operation, i.e. when the winding spool 2 is in a bare state; and a speed ratio $\omega_1/\omega_5$ of the gear 1 to gear 5 to a level equal to or lower than a ratio of the diameter of the rewinding spool 6 in a bare state to a maximum diameter of the winding of film on the winding spool 2 since the diameter $D_6$ of the rewinding spool 6 is minimal when no film is left on the rewinding spool 6, i.e. at the end of a winding operation, with the dimater $D_2$ of the winding of film on the winding spool 2 attaining a maximal level. When the speed ratios $\omega_1/\omega_3$, $\omega_1/\omega_5$ are set as mentioned above, a speed ratio $\omega_3/\omega_5$ of the gear 3 to gear 5 is naturally set to a level equal to or lower than a ratio of the diameter of the rewinding spool in a bare state to that of the sprocket.

The relation between the above-mentioned elements during a rewinding operation, in which the gears 1, 3, 5 are rotated in a direction opposite to the direction in which they are rotated during a winding operation, is determined by the formulae, $\omega_5 \cdot D_6/D_4 \leq \omega_3$ and $\omega_5 \cdot D_6/D_2 \leq \omega_1$, i.e. $\omega_3/\omega_5 \geq D_6/D_4$ and $\omega_1/\omega_5 \geq D_6/D_2$. In order to maintain this relation constantly during a rewinding operation, a speed ratio $\omega_3/\omega_5$ of the gear 3 to gear 5, and a speed ratio $\omega_1/\omega_5$ of the gear 1 to gear 5 should be set to levels different from those in the case of a winding operation. Namely, the speed ratio $\omega_3/\omega_5$ should be set to a level equal to or higher than a ratio of a maximum diameter of the winding of film on the rewinding spool 6 to the diameter of the sprocket 4; and the speed ratio $\omega_1/\omega_5$ to a level equal to or higher than a ratio of a maximum diameter of the winding of film on the rewinding spool 6 to the diameter of the winding spool 2 in a bare state. When a speed ratio of the gear 1 to gear 3 is set to the same level for both winding and rewinding operations so as to satisfy the winding condition, $\omega_1/\omega_3 \geq D_4/D_2$, the same condition, $\omega_1/\omega_3 \geq D_4/D_2$ can be maintained in a rewinding operation. Accordingly, when the above condition and the rewinding condition, $\omega_3/\omega_5 \geq D_6/D_4$ are satisfied, the condition $\omega_1/\omega_5 \geq D_6/D_2$ is also satisfied. Therefore, only the speed ratio of the gear 3 to gear 5 may be changed to carry out both winding and rewinding operations as in the embodiments shown in the drawings. The present invention is not, of course, limited to the embodiments shown in the drawings. A speed ratio of the winding shaft to the sprocket shaft in a winding operation and that in a rewinding operation may be set to different levels provided that the above-mentioned winding and rewinding conditions are satisfied.

When the above-described structure is subjected to a winding operation, the gear 1 is rotated counter-clockwise, and the clutch discs 7a in the one-way clutch 7 come into engagement with the gear 1 and winding spool 2. Consequently, the winding spool 2 is rotated with the gear 1 to wind the film therearound. Since the speed of revolution of the sprocket 4 being driven counter-clockwise by the film being wound is higher than that of the gear 3 being driven counter-clockwise by the rotation transmission mechanism, the sprocket 4 is rotated smoothly and lightly without any trouble and without accompanying an operation of the one-way clutch 8. Since the gear 5 is rotated counter-clockwise by the rotation transmission mechanism at a speed of revolution higher than that of the rewinding spool 6, the rewinding spool 6 is rotated by the film counter-clockwise, smoothly and lightly without any trouble and without accompanying an operation of the one-way clutch 9.

In a loading operation, which is conducted prior to the winding operation described above, the sprocket 4 is rotated counter-clockwise with the gear 3 by the one-way clutch 8 in the same manner as the winding spool 2, which is rotated counter-clockwise with the gear 1 by an operation of the one-way clutch 7. Thus, the film is fed at a speed not higher than a surface speed of the winding spool so as to satisfy the above-mentioned condition, $\omega_1 \cdot D_2/D_4 \geq \omega_3$. Therefore, when catches for perforations in the film are provided on the surface of the winding spool 2 rotated at a high speed, the film can be taken up easily around the winding spool 2. When the film is being taken up around the winding spool 2, the speed of counter-clockwise revolution of the sprocket 4 becomes higher than the speed of revolution of the gear 3, so that a relative movement occurs therebetween. Accordingly, when a relative movement detector means, such as a photocoupler, or a detector adapted to receive an output from a film counter is provided, a predetermined number of frames can be fed uselessly during a loading operation, in accordance with a detected signal representative of the relative movement occurring between the sprocket 4 and gear 3. Needless to say, the rewinding spool is rotated by the film counter-clockwise, smoothly and lightly during a loading operation thereof. As may be clear from the above, an auto-loading system can be employed easily in the film winding device according to the present invention.

During a rewinding operation, which has already been described in the previous paragraph, the change-over gear 11 is shifted to allow the gears 1, 3, 5 to be rotated clockwise, and the clutch discs 9a in the one-way clutch 9 come into engagement with the gear 5 and rewinding spool 6. Consequently, the rewinding spool 6 is rotated clockwise with the gear 5 so as to rewind the film. Since the speed of revolution of the sprocket 4 driven clockwise by the film being rewound is not higher than that of the gear 3, the sprocket 4 is rotated smoothly and lightly without any trouble and without accompanying an operation of the clutch 8. Also, the winding spool 2 is rotated by the film clockwise, smoothly and lightly without any trouble and without accompanying an operation of the clutch 7.

Figure 4:
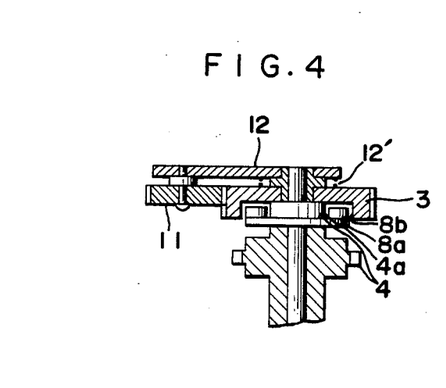
FIG. 4 is a sectional view of a sprocket portion of the embodiment shown in FIG. 3.

The rewinding devices shown in the drawings are so designed that, when the winding counter-clockwise direction of the gear 3 is shifted to the rewinding clockwise rotation or the other way round, the change-over gear 11 is shifted automatically from the winding engagement condition to the rewinding engagement condition or the other way around. As referred to above, the change-over arm 12 supporting the change-over gear 11 is provided oscillatably with respect to the shaft of the sprocket 4, i.e. the gear 3 mounted thereon. As shown in FIG. 4, a friction spring 12' is provided between the change-over arm 12 and gear 3. Therefore, when the gear 3 is rotated in the winding direction, i.e. counter-clockwise, the change-over arm 12 is moved counter-clockwise owing to the frictional force of the friction spring 12' to engage the change-over gear 11 with the over-drive gear 13 in the embodiment shown in FIG. 1, and with the gear 5 in the embodiment shown in FIG. 3. When the gear 3 is rotated in the rewinding direction, i.e. clockwise, the change-over arm 12 is moved clockwise to engage the change-over gear 11 with the synchronous gear 16 in the embodiment shown in FIG. 1, and with the reduction gear 18 in the embodiment shown in FIG. 3. Thus, when the direction of rotation of the gear 3 has been shifted, the change-over gear 11 is shifted automatically. As may be clearly understood from the above, the present invention permits employing such an advantageous rewinding system easily, in which preparatory operations including the manual shifting of the change-over gear 11, the releasing of the sprocket, and the disconnecting of the winding shaft from the winding spool are not required. The above is of great advantage to the automation of an operation of a camera. For example, in order to shift a winding operation to a rewinding operation automatically by using the above-described change-over mechanism, in accordance with a detected signal representative of a sudden variation in a winding resistance, which occurs when the film has been entirely paid out from the cartridge, the motor may be merely reversed. In both winding and rewinding operations, the winding spool 2 and gear 1, the sprocket 4 and gear 3, and the rewinding spool 6 and rewinding shaft 5, are rotated in the same direction, respectively. As a result, the film can be wound and rewound smoothly and lightly without applying any excessive tensile force thereto. Thus, the ending of a winding operation and the occurrence of abnormal tension of the film due to the breakage of a perforation therein can be detected easily. The ending of a winding operation and such an abnormal phenomenon can be displayed in accordance with a detected signal, and, when a motor is used to drive the film, it can be easily stopped or reversed to rewind the film. Even when a means for detecting such abnormal condition of the winding device in accordance with variations in a load current from the motor is utilized, the object can be achieved far more accurately than in a conventional winding device of this kind.

The winding devices shown in the drawings are motordriven winding devices, in which the winding spool 2 serves as a motor case, and in which the rotation of a gear 21 mounted on the motor shaft is transmitted to the connecting gear 10, and then to the gear 1 mounted on the winding shaft, gear 3 mounted on the shaft of sprocket and gear 5 mounted on the rewinding shaft. Even when a motor is used in this manner, winding and rewinding operations can be carried out lightly and smoothly. This allows the winding device to be miniaturized, and the consumption of the power source battery to be much reduced as compared with that in a conventional winding device of this kind.

Figure 5:
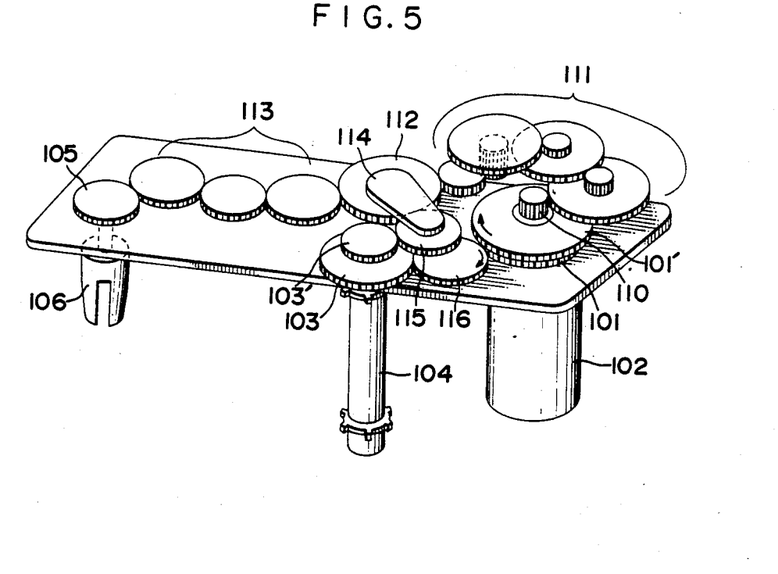
FIG. 5 is a perspective view illustrating still another embodiment of a winding device according to the present invention.
Figure 6:
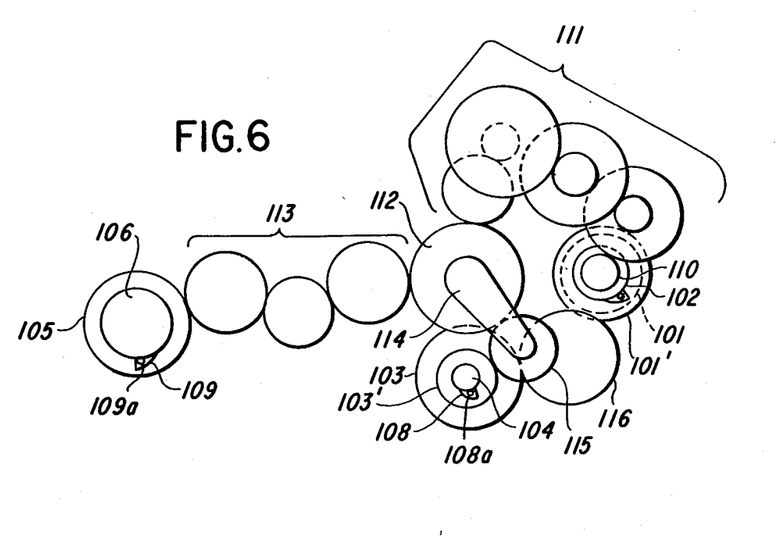
FIG. 6 is a plan view of the embodiment shown in FIG. 5.

FIG. 5 is a perspective view of still another embodiment of a camera device according to the present invention, and FIG. 6 a plan view of the embodiment shown in FIG. 6. Referring to these drawings, reference numerals 101, 101' denote gears joined together and mounted on a winding shaft, 102 a winding spool containing a motor serving as a driving power source, 103, 103' gears joined together and mounted on the shaft of a sprocket, 104 a sprocket, 105 a gear mounted on a rewinding shaft, and 106 a coupling, i.e. a rewinding spool, which is used for a cartridge-contained film and which is engageable with the cartridge for such a film.

In the embodiments shown in these drawings, one-way clutches 107, 108, 109 are provided between the above-mentioned gears and spool or sprocket as shown in FIG. 6. The one-way clutches 107, 108, 109 shown in FIG. 6 are formed by fitting clutch discs 107a, 108a, 109a in clutch spaces surrounded by inclined clutch surfaces on the inner side of the gears 101, 103, 105 and outer circumferential clutch portions of the winding spool 102, sprocket 104 and rewinding spool 106. The one-way clutch 107 provided between the gear 101 and winding spool 102 and the one-way clutch 108 provided between the gear 103 and sprocket 104, out of the above-mentioned one-way clutches 107, 108, 109 are designed in the following manner. When the gears 101, 103 are rotated counter-clockwise with respect to the winding spool 102 and sprocket 104, respectively, the clutch discs 107a, 108a are pressed by the inclined clutch surfaces of the gers 101, 103 to be brought into engagement with the outer circumferential clutch portions of the winding spool 102 and sprocket 104, so that the gears 101, 103 and the winding spool 102 and sprocket 104 are connected together. While the gears 101, 103 are not in the above-described rotational state, the clutch discs 107a, 108a are floated in the clutch spaces to keep the gears 101, 103 and the winding spool 102 and sprocket 104 independent of each other. The one-way clutch 109 provided between the gear 105 and rewinding spool 106 has an inclined clutch surface on the gear 5, the direction of inclination of which is opposite to that of the inclined clutch surfaces in the one-way clutches 107, 108. When the gear 105 is rotated clockwise with respect to the rewinding spool 106, they are operatively connected together. While the gear 105 is not rotated in the above-mentioned manner, the gear 105 and rewinding spool 106 can be rotated independently of each other. These one-way clutches 107, 108, 109 are not limited to such types of construction as shown in the drawings; they may, of course, have inclined clutch surfaces on the side of the spool or sprocket, or employ a ratchet type construction.

The gears 101, 101'; 103, 103'; 105 are all connected to a gear 110 mounted on the shaft of a motor contained in the winding spool 102. The rotation of the gear 110 is transmitted to a branch gear 112 via a train of reduction gears 111, and then to the gear 105 via a train of transmission gears 113. The transmission of a rotary force from the branch gear 112 to the gears 101, 101' and gears 103, 103' is carried out in the following manner. During a winding operation, a change-over gear 115, which is supported via a shaft on a change-over arm 114 oscillatable about the shaft of the branch gear 112, and which is engaged with the branch gear 112, is engaged with the gear 101' while the gears 101, 103 are connected together operatively via a carrier gear 116. During a rewinding operation, the change-over gear 115 is engaged with the gear 103' to transmit a rotary force from the side of the gear 103 toward the gear 101.

The mode of engagement of the change-over gear 115 in a winding operation is shifted to that in a rewinding operation, and vice versa, automatically by reversing the mode of rotation of the motor in the winding or rewinding operation. The change-over gear 115 shown in the drawings is in a mode of engagement thereof in a rewinding operation. When the branch gear 112 in the drawings is rotated in the winding direction, i.e. counter-clockwise in accordance with the rotation of the motor, the pressure of the teeth thereof and a reaction force of the teeth of the gear 103' work so as to disengage the change-over gear 115 from the gear 103'. Accordingly, the gear 103' and change-over gear 115 are disengaged from each other easily, and the change-over arm 114 is rotated counter-clockwise owing to the frictional force applied thereto from the rotating branch gear 112 and the power received by a shaft-supporting portion of the change-over gear 115 from the teeth of the branch gear 112 via the teeth of the change-over gear 115, which are pressed by the teeth of the branch gear 112. Consequently, the change-over gear 115 comes into engagement with the gear 101'. When the change-over gear 115 has come into engagement with the gear 101', the pressure of the teeth of the branch gear 112 and the reaction force of the teeth of the gear 101' work so as to deepen the meshing of the change-over gear 115 with the gears 112, 101', so that these gears are not disengaged from one another. When the rotation of the motor is reversed to cause the branch gear 112 to be rotated in the rewinding direction, i.e. clockwise, the change-over gear 115 is disengaged from the gear 101' easily in the same manner as mentioned above, so that the change-over gear 115 regains the mode of engagement shown in the drawings.

The gears 101, 101'; 103, 103'; 105 are connected together operatively by the above-described rotation transmission mechanism. The embodiment shown in the drawings is so constructed that all of the gears 101, 101'; 103, 103'; 105 are rotated by the transmission mechanism counter-clockwise in a winding operation, and clockwise in a rewinding operation. The above rotation transmission mechanism is designed so as to rotate these three sets of gears in the following speed ratio.

During a winding operation, the gears 103, 103' are rotated at a speed of revolution not higher than that of the sprocket 104 rotated by the film being wound around the winding spool 102, which is rotated by the gears 101, 101', and the gear 105 at a speed of revolution not lower than that of the rewinding spool 106 also rotated by the film. During a rewinding operation, the gears 103, 103' are rotated at a speed of revolution not lower than that of the sprocket 104 rotated by the film being rewound around the rewinding spool 106, which is rotated by the gear 105, and the gear 101 at a speed of revolution not lower than that of the winding spool 102 also rotated by the film.

Let $\omega 1$ equal the speed of revolution of the gears 101, 101'; $\omega 3$ the speed of revolution of the gears 103, 103'; $\omega 5$ the speed of revolution of the gear 105; D2 the diameter of the winding of film on the winding spool 102; D4 the diameter of the sprocket 104; and D6 the diameter of the winding of film on the rewinding spool 106. The relation between these elements during a winding operation is determined by the formulae, $\omega 1 \cdot D2/D4 \geq \omega 3$ and $\omega 1 \cdot D2/D6 \leq \omega 5$, i.e. $\omega 1/\omega 3 \geq D4/D2$ and $\omega 1/\omega 5 \leq D6/D2$ or $\omega 3/\omega 5 \leq D6/D4$. In order to maintain this relation constantly during a winding operation, it is necessary to set a speed ratio $\omega 1/\omega 3$ of the gear 103 to gear 103' or a ratio Z3/Z1 of the number of teeth of the gear 103 to that of the gear 101 in the embodiment shown in the drawings to a level equal to or higher than a ratio of diameter of the sprocket 104 to that of the winding spool in a bare state since the diameter D2 of the winding of film on the winding spool 102, which is increased as a film winding operation progresses, is minimal in an initial stage of a film winding operation, i.e. when the winding spool 102 is in a bare state; and a speed ratio $\omega 1/\omega 5$ of the gears 101, 101' to gear 105 or a ratio Z5/Z1' of the number of teeth of the gear 105 to gear 101' to a level equal to or lower than a ratio of the diameter of the rewinding spool 106 in a bare state to a maximum diameter of the winding of film on the winding spool 102 since the diameter D6 of the rewinding spool 106 is minimal when no film is left on the rewinding spool 106, i.e. at the end of a winding operation, with the diameter D2 of the winding of film on the winding spool 102 attaining a maximal level. When the speed ratios $\omega 1/\omega 3$, $\omega 1/\omega 5$ are set as mentioned above, a speed ratio $\omega 3/\omega 5$ of the gears 103, 103' to gear 105 is naturally set to a level equal to or lower than a ratio of the diameter of the rewinding spool 106 in a bare state to that of the sprocket 104.

The relation between the above-mentioned elements during a rewinding operation, in which the gears 101, 101'; 103, 103'; 105 are rotated in a direction opposite to the direction in which they are rotated during a winding operation, is determined by the formulae, $\omega 5 \cdot D6/D4 \leq \omega 3$ and $\omega 5 \cdot D6/D2 \leq \omega 1$, i.e. $\omega 3/\omega 5 \geq D6/D4$ and $\omega 1/\omega 5 \geq D6/D2$. In order to maintain this relation constantly during a rewinding operation, a speed ratio $\omega 3/\omega 5$ of the gears 103, 103' to gear 105 or a ratio Z5/Z3' of the number of teeth of the gear 105 to that of the gear 103' in the embodiment shown in the drawings, and a speed ratio $\omega 1/\omega 5$ of the gears 101, 101' to gear 105 should be set to levels different from those in the case of a winding operation. Namely, the speed ratio $\omega 3/\omega 5$ should be set to a level equal to or higher than a ratio of a maximum diameter of the winding of film on the rewinding spool 106 to the diameter of the sprocket 104; and the speed ratio $\omega 1/\omega 5$ to a level equal to or higher than a ratio of a maximum diameter of the winding of film on the rewinding spool 106 to the diameter of the winding spool 102 in a bare state. A speed ratio of the gears 101, 101' to gears 103, 103' is set so as to satisfy the winding condition, $\omega 1/\omega 3 = Z3/Z1 \geq D4/D2$, and the above relation does not vary in a rewinding operation. Therefore, when the above condition and the rewinding condition, $\omega 3/\omega 5 = Z5/Z3' \geq D6/D4$ referred to previously are satisfied, the condition, $\omega 1/\omega 5 \geq D6/D2$ is also satisfied.

The operation of the above-described structure is the same as that of the first two embodiments. When a rewinding operation progresses in the last embodiment, so that the film is removed from the winding spool 102 and then from the sprocket 104, the winding spool 102 and sprocket 104 cease to receive a rotary force from the film. Consequently, the relative speeds of revolution of the winding spool 102 and sprocket 104 with respect to the gears 101, 101' and gear 102 are varied. When such variation in the relative speeds of revolution of the winding spool 102 and sprocket 104 is found out by a detecting means, such as a photo-coupler to display the completion of a rewinding operation, or stop the motor in the case of a winding device driven by a motor, a cartridge-contained film can be rewound with the lead-out end thereof left outside the cartridge.

In the above-described rotation transmission mechanism, the transmission change-over means consisting of the change-over gear 115 is provided in such a manner that the speed ratio of the gears 101, 101'; 103, 103' to the gear 110 in a winding operation is different from that in a rewinding operation with the speed ratio of the gear 105 to gear 110 in a winding operation identical with that in a rewinding operation. Consequently, the absolute value of $\omega 5$ in the winding conditions, $\omega 1/\omega 5 \leq D6/D2$ and $\omega 3/\omega 5 \leq D6/D4$, and the rewinding conditions, $\omega 1/\omega 5 \geq D6/D2$ and $\omega 3/\omega 5 \geq D6/D4$, in a winding operation usually becomes equal to that in a rewinding operation. When the transmission change-over means is shifted, the speed ratio of the gears 101, 101'; 103,103' is thus increased. Therefore, this rotation transmission mechanism is free from a decrease in the rewinding speed, which causes an increase in the rewinding time, unlike a rotation transmission mechanism, in which a transmission change-over means is so positioned that the speed ratio of the gears 101, 101'; 103, 103' is invariable with the speed ratio of the gear 105 variable. Since the change-over gear 115 can be engaged interchangeably with the gears 101, 101' and gears 103, 103' to change the film speed, it is unnecessary to additionally provide a gear train for the reduction of the film speed. This allows the construction of the winding device to be simplified, the power transmission efficiency thereof to be improved, and the power consumption of a battery as a driving power source to be reduced.

When the gears 101, 101' out of the gears 101, 101'; 103, 103' consist of the same gears, the winding conditions are satisfied by $\omega 1/\omega 3 = Z3/Z1 = D4/\overline{D2}$, $\omega 3/\omega 5 = Z5/Z3 = \overline{D6}/D4$, and the rewinding conditions by $\omega 1/\omega 3 = Z3/Z1 = D4/\overline{D2}$, $\omega 3/\omega 5 = Z5/Z3' = \overline{D6}/D4$ (wherein $\overline{D2}$ is the diameter of the winding spool in a bare state; and $D6$ and $\overline{D6}$ are the diameter of the rewinding spool 106 in a bare state and a maximum diameter of the winding of film thereon, respectively). Accordingly, the ratio of the number of teeth of the gear 103 to gear 103' may satisfy the formula, $Z3/Z3' \geq \overline{D6}/D6$. When the gears 103, 103' consist of the same gears, the winding conditions are satisfied by $\omega 1/\omega 3 = Z3/Z1 = D4/\overline{D2}$, $\omega 1/\omega 5 = Z5/Z1' = \overline{D6}/\overline{D2}$, and the rewinding conditions by $\omega 1/\omega 3 = Z3/Z1 = D4/\overline{D2}$, $\omega 1/\omega 5 = Z5/Z1 = \overline{D6}/D2$ (wherein $\overline{D2}$ is a maximum diameter of the winding of film on the winding spool 102). Accordingly, the ratio of the number of teeth of the gear 101 and gear 101' may satisfy the formula, $Z1/Z1' \leq \overline{D6} \cdot D2/\overline{D6} \cdot \overline{D2}$. Thus, one of the groups of gears 101, 101'; 103, 103' may consist of the same gears.

According to the present invention described above, a film can be wound and rewound stably, smoothly and lightly, and film winding and rewinding operations can be fully automated easily by using a motor. Moreover, the present invention permits simplifying the construction of a winding device, minimizing the power consumption thereof and carrying out easily the reduction of the dimensions and weight thereof, and has many other advantageous effects.

The camera device according to the present invention has many excellent characteristics as referred to in the opening paragraph of the specification. The present invention is not, of course, limited to the embodiments shown in the drawings. It may be modified by employing a manual winding system having a winding lever; or a rotation transmission mechanism for the winding shaft, sprocket shaft and rewinding shaft, which consists of a wrapping connector instead of a gear train. It may also be modified in such a manner that the direction in which the winding shaft is rotated in a winding operation is different from that in which the winding shaft is rotated in a rewinding operation. It may also be modified to a camera device which permits taking photographs while rewinding a film which has been wound around the winding spool beforehand.

The characteristics of the film winding and rewinding device for cameras, which has been described above, will now be summarized.

(1) In a conventional film winding mechanism for cameras, a film winding rate per a unit angle of rotation of the winding spool is varied due to an increase in the diameter thereof with the progress of a film winding operation but the diameter of the shaft of sprocket is not varied. In order to compensate the difference between the winding rates of these shafts, a friction clutch is provided on the winding shaft. Thus, the friction resistance of the friction clutch works as a winding resistance, so that a torque required for a winding operation is increased.

On the other hand, the film winding device according to the present invention does not employ a friction clutch, so that a winding torque is low. This allows a motor in use to be miniaturized, and the consumption of a power source battery to be reduced.

(2) In the winding device according to the present invention, the sprocket is also driven in the winding direction. Therefore, when the front end of a film is brought into engagement with the teeth of the sprocket, the film is fed thereby. Thus, this winding device can be used suitably for the automatic loading of a film.

(3) When a film winding operation progresses with the residual amount of film in the cartridge reduced, an angle at which the film enters a film outlet of the cartridge becomes far smaller than 180°, so that a winding resistance is increased due to the friction occurring in the outlet of the cartridge. As a result, the winding operation is interrupted or the film is damaged in some cases. In the winding device according to the present invention, the rewinding shaft is rotated in both a winding operation and a rewinding operation. The shaft of the cartridge is vibrated due to the rotation of the rewinding shaft, and the friction resistance at the outlet of the cartridge is reduced. Accordingly, the above-mentioned inconveniences encountered in a conventional winding device can be eliminated.

(4) In order to start a rewinding operation in a conventional winding device, it is necessary that a sprocket-releasing operation for disengaging a sprocket from the transmission system be carried out. In the winding device according to the present invention, the sprocket is rotated forwardly and backwardly, so that it is not necessary to carry out a sprocket-releasing operation. Accordingly, the camera can be handled conveniently without any handling errors even by beginners.

Especially, the device according to the present invention can be used very effectively as an automatic winding and rewinding device, which permits detecting the completion of a film-winding operation as, for example, an increase in the winding resistance to automatically shift the winding operation to a rewinding operation.

(5) In order to shift a winding operation to a rewinding operation in a conventional device of this kind, it is necessary to disengage a winding rotary part from the transmission system and connect a rewinding shaft in a free state to the transmission system. Such a troublesome operation is not required in the winding device according to the present invention, so that a camera provided therewith can be handled easily without errors even by beginners.

The device according to the present invention can be used very advantageously, especially, as an automatic winding and rewinding device referred to in paragraph (4) above.

(6) During a rewinding operation carried out by the device according to the present invention, the shaft of sprocket is rotated by the driving power source, while the sprocket is rotated by the film alone. Therefore, when the film has been removed from the sprocket at such time that is close to the time of completion of a rewinding operation, the sprocket stops being rotated. Accordingly, when a means for detecting the rotation of the sprocket is provided to detect the stoppage of the rotation of the sprocket and immediately stop the rewinding operation, an end portion of the film can be prevented from being wound into the cartridge. A combination of a slit disc mounted on a prolonged portion of the sprocket shaft and a photo-coupler for detecting the rotation of the slit disc can be used as the detecting means mentioned above.

Figure 7:
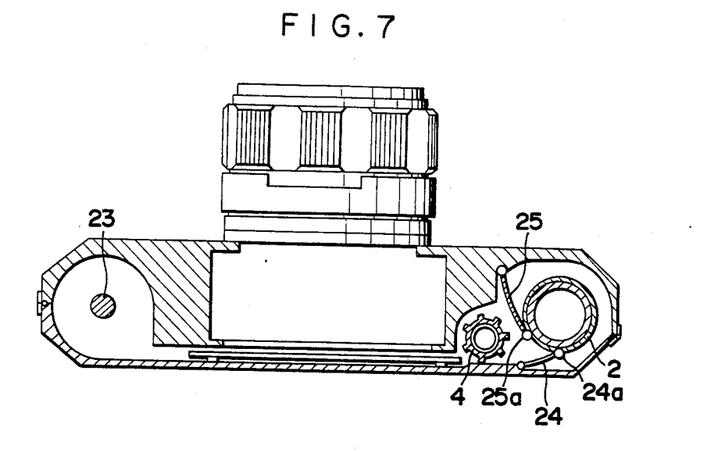
FIG. 7 is a plan view partially in section of a camera, illustrating an example of a winding means.
Figure 8:
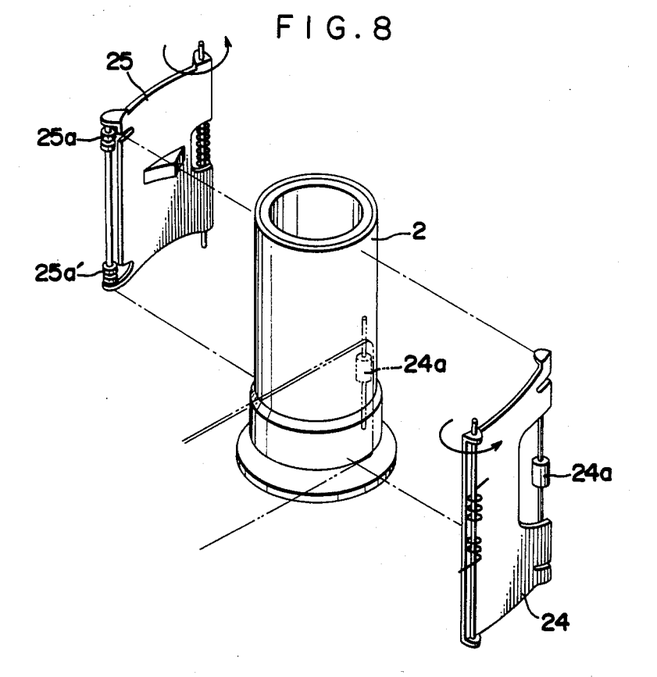
FIG. 8 is a perspective view of a take-up spool portion of the winding means shown in FIG. 7.

FIG. 7 is a plan view partially in section of a part of a camera, illustrating an example of a film winding means, and FIG. 8 a perspective view of a winding spool portion of a camera.

Referring to FIGS. 7 and 8, reference numeral 23 denotes a coupling shaft engageable with the spool of a cartridge, 24 a first guide-winding member provided with a press roll 24a at a free end thereof, and adapted to guide a front end of a film to the circumferential surface of a winding spool 2 and bring the former into press contact with the latter, and 25 a second guide-winding member also provided with press rolls 25a, 25a' at a free end thereof, and adapted to guide a front end of a film to the circumferential surface of the winding spool 2 and bring the former into press contact with the latter. When the sprocket 4 is rotated, a film, which is loaded in the camera in such a manner that the film is drawn from a cartridge and engage a front end thereof with the sprocket 4, is fed to a winding spool 2 as the teeth of the sprocket 4 come into engagement with the perforations in the film. The film is thus automatically wound around the winding spool 2 owing to the frictional characteristics of the first and second guide-winding members 24, 25 and the circumferential surface of the winding spool 2. In order that the film may be wound around the winding spool 2 without trouble and without being slackened, it is necessary that the peripheral speed of the winding spool 2 be higher than the speed of the film being fed by the sprocket 4. Moreover, when the speed of revolution of the winding spool 2 is constant, the take-up speed thereof is gradually increased as the diameter of the winding of film on the winding spool 2 is increased. The present invention permits compensating with a low resistance the difference occurring between the take-up speed of the winding spool 2 and the feed speed of the sprocket 4 rotated by a driving power source.

Finally, some employable modes of embodiments of the present invention will be described.

(1) A winding spool and a rewinding spool are connected to a driving power source via a one-way clutch, respectively, and a rotation transmission ratio used in a winding operation is changed when a rewinding operation is carried out, and vice versa. (Embodiments shown in the drawings)

(2) A winding spool is connected via a clutch, and a rewinding shaft directly, to a driving power source, and a rotation transmission ratio used in a winding operation is changed when a rewinding operation is carried out, and vice versa.

(3) A winding shaft is connected directly, and a rewinding shaft via a clutch, to a driving power source, and a rotation transmission ratio used in a winding operation is changed when a rewinding operation is carried out, and vice versa.

(4) A winding shaft is connected via a clutch, and a rewinding shaft via a one-way clutch, to a driving power source. The rotation transmission ratio of these shafts may not be changed in winding and rewinding operations.

(5) A winding shaft is connected via a one-way clutch, and a rewinding shaft via a clutch, to a driving power source. The rotation transmission ratio of these shafts may not be changed in winding and rewinding operations.

What is claimed is:

1. A camera device comprising
    (i) a rotatable film winding spool, on the circumferential surface of which a film is wound,
    (ii) a rotatable film rewinding spool, by the rotation of which the film is rewound,
    (iii) a driving power source,
    (iv) driving power transmission means for transmitting a driving power from said driving power source to said winding spool and rewinding spool, and
    (v) one-way clutches each provided between said driving power transmission means and said winding spool and between said driving power transmission means and said rewinding spool,
    (vi) wherein a revolution speed in a winding direction of said driving power transmission means during a winding operation is set to a level not lower than a revolution speed of said rewinding spool rotated by the film.

2. A camera device according to claim 1, wherein said driving power source is a motor.

3. A camera device according to claim 1, wherein said driving power transmission means is a gear train.

4. A camera device according to claim 1, wherein a revolution speed in a rewinding direction of said driving power transmission means during a rewinding operation is set to a level not lower than a revolution speed of said winding spool rotated by the film.

5. A camera device comprising
    (i) a rotatable film winding spool, on the circumferential surface of which a film is wound,
    (ii) a rotatable film rewinding spool, by the rotation which the film is rewound,
    (iii) a rotatable sprocket engaging with perforations of the film,
    (iv) a driving power source,
    (v) driving power transmission means for transmitting a driving power from said driving power source to said winding spool, rewinding spool, and sprocket, and
    (vi) one-way clutches each provided in said driving power transmission means, winding spool, rewinding spool, and sprocket,
    (vii) wherein a revolution speed in a winding direction of said driving power transmission means during a winding operation is set to a level not lower than a revolution speed of said rewinding spool rotated by the film and a revolution speed in a rewinding direction of said driving power transmission means is set to a level not higher than a revolution speed of said sprocket rotated by the film.

6. A camera device according to claim 5, wherein said driving power source is a motor.

7. A camera device according to claim 5, wherein said driving power transmission means is a gear train.

8. A camera device according to claim 5, wherein the revolution speed in the rewinding direction of said driving power transmission means during a rewinding operation is set to a level not lower than a revolution speed of said winding spool rotated by the film and the revolution speed in the rewinding direction of said driving power transmission means is set to a level not lower than the revolution speed of said sprocket rotated by the film.

9. An automatic winding device of a camera comprising
   (i) a one-way clutch arranged between a driving power transmission means for transmitting a rotary driving power from a driving power source to a sprocket and said sprocket for transmitting only a driving power in a film winding direction from said driving power transmission means to said sprocket,
   (ii) wherein a revolution speed in a winding direction of said driving power transmission means during a winding operation is set to a level not higher than a revolution speed of said sprocket rotated by the film, and
   (iii) a revolution speed in a rewinding direction of said driving power transmission means during a rewinding operation is set to a level not lower than the revolution speed of said sprocket rotated by the film; and
   (iv) a one-way clutch arranged between said driving power transmission means and a reversely rotatable film winding spool for transmitting only a driving power in a film winding direction from said driving power transmission means to said winding spool,
   (v) wherein the revolution speed in the rewinding direction of said driving power transmission means during the rewinding operation is set to a level not lower than a revolution speed of said winding spool rotated by the film.

10. An automatic winding device of a camera according to claim 9, further comprising
   (i) a one-way clutch arranged between the driving power transmission means and a reversely rotatable film rewinding spool for transmitting only a driving power in a film rewinding direction from said driving power transmission means to said rewinding spool,
   (ii) wherein the revolution speed in the winding direction of said driving power transmission means during the winding operation is set to a level not lower than a revolution speed of said rewinding sprocket rotated by the film.

* * * * *